United States Patent
Custodero et al.

(10) Patent No.: US 10,618,236 B2
(45) Date of Patent: Apr. 14, 2020

(54) TIRE READY TO RECEIVE A MEMBER ON THE SURFACE THEREOF

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Emmanuel Custodero, Clermont-Ferrand (FR); Vincent Lemal, Clermont-Ferrand (FR); Catherine Gauthier, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 261 days.

(21) Appl. No.: 15/537,527

(22) PCT Filed: Dec. 18, 2015

(86) PCT No.: PCT/EP2015/080418
§ 371 (c)(1),
(2) Date: Jun. 19, 2017

(87) PCT Pub. No.: WO2016/097257
PCT Pub. Date: Jun. 23, 2016

(65) Prior Publication Data
US 2017/0348930 A1  Dec. 7, 2017

(30) Foreign Application Priority Data
Dec. 19, 2014  (FR) ..................... 14 62954

(51) Int. Cl.
*B29D 30/00* (2006.01)
*B60C 23/04* (2006.01)
(Continued)

(52) U.S. Cl.
CPC ............ *B29D 30/0061* (2013.01); *B60C 1/00* (2013.01); *B60C 23/0493* (2013.01); *C08K 3/04* (2013.01);
(Continued)

(58) Field of Classification Search
CPC .................... B60C 23/0493; B29D 2030/0072
See application file for complete search history.

(56) References Cited

U.S. PATENT DOCUMENTS 7,618,705 B2 * 11/2009 Tabata ...................... B32B 7/12
428/355 BL
8,088,481 B2 * 1/2012 Tabata ................... B60C 19/00
428/343

(Continued)

FOREIGN PATENT DOCUMENTS

FR  2 929 076 A1  10/2009
FR  3 002 879 A1  9/2014
(Continued)

*Primary Examiner* — Liam J Heincer
(74) *Attorney, Agent, or Firm* — Venable LLP

(57) ABSTRACT

A tire comprises an inner surface and/or outer surface with an accommodating region, an adhesive layer arranged on said accommodating region and a protective film arranged on said adhesive layer, characterized in that said adhesive layer is based on a block thermoplastic elastomer (TPE) comprising an elastomer block based on a diene elastomer comprising a molar content (or content by weight) of unsaturations of greater than 10%.

20 Claims, 2 Drawing Sheets

(51) Int. Cl.
*C09J 153/02* (2006.01)
*C08K 3/04* (2006.01)
*B60C 1/00* (2006.01)

(52) U.S. Cl.
CPC ..... *C09J 153/02* (2013.01); *B29D 2030/0072* (2013.01)

(56) References Cited

U.S. PATENT DOCUMENTS

| | | | |
|---|---|---|---|
| 9,003,873 B2 | 4/2015 | Scheungraber et al. | B60C 23/0493 |
| 2003/0089451 A1* | 5/2003 | Koch | B29C 33/0016 156/245 |
| 2005/0084640 A1* | 4/2005 | Bilodeau | B32B 7/06 428/40.1 |
| 2006/0016534 A1* | 1/2006 | Peyron | B60C 13/001 152/152.1 |
| 2010/0071823 A1* | 3/2010 | Tomoi | B29D 30/0681 152/510 |
| 2011/0082258 A1* | 4/2011 | Walton | C08F 297/083 525/89 |
| 2012/0199260 A1* | 8/2012 | Merino Lopez | B29C 73/163 152/504 |
| 2012/0208962 A1* | 8/2012 | Walton | C08L 23/10 525/88 |
| 2012/0248274 A1 | 10/2012 | Scheungraber et al. | 248/309.1 |
| 2012/0285597 A1* | 11/2012 | Abad | C08L 53/00 152/450 |
| 2012/0291933 A1* | 11/2012 | Tanno | B60C 19/002 152/209.18 |
| 2014/0261966 A1* | 9/2014 | Muller-Wilke | B29D 30/0061 156/75 |
| 2015/0034227 A1* | 2/2015 | Tsou | B32B 25/08 152/510 |
| 2016/0031190 A1* | 2/2016 | Greiveldinger | B60C 1/0008 428/519 |
| 2016/0130485 A1* | 5/2016 | Free | B32B 7/12 428/41.7 |
| 2017/0066218 A1* | 3/2017 | Maligie | B32B 7/04 |
| 2017/0144398 A1* | 5/2017 | Merino Lopez | B29D 30/54 |
| 2018/0086159 A1* | 3/2018 | Lemal | B29D 30/0061 |

FOREIGN PATENT DOCUMENTS

| | | |
|---|---|---|
| FR | 3 003 506 A1 | 9/2014 |
| WO | 99/62998 A1 | 12/1999 |
| WO | 2011/047791 A1 | 4/2011 |

\* cited by examiner

TIRE READY TO RECEIVE A MEMBER ON THE SURFACE THEREOF

FIELD OF THE INVENTION

The present invention relates to tyres, and more particularly to tyres ready to receive a member, for example an electronic member, fixed to the inner and/or outer surface thereof.

PRIOR ART

The recent development of systems for monitoring tyres of a running vehicle ("Tyre Pressure Monitoring Systems" or "TPMSs") is limited by the difficulty of rapidly and durably attaching an object to the surface of a tyre.

Document US 2012/0248274 proposes a tyre comprising an inner and/or outer surface with an accommodating region, an adhesive layer arranged on this accommodating region and a protective film arranged on the adhesive layer, in which the adhesive layer consists of a fabric embedded in a thermoplastic material. After having removed the protective film from the surface of the adhesive layer, the adhesive layer of the accommodating region of the tyre and the attachment layer of the member are brought into contact. The presence of the fabric ensures stable attachment of the adhesive layer to the surface of the tyre during the vulcanization of the tyre. The attachment layer of the member also consists of a thermoplastic material and the reversible attachment of the member to the surface of the tyre is ensured by bringing the two layers, adhesive layer and attachment layer, into contact after softening thereof by heating.

This document gives no indication as to the nature of the thermoplastic materials which may be used.

BRIEF DESCRIPTION OF THE INVENTION

A subject of the invention is a similar tyre, characterized in that the composition of the adhesive layer is based on a block thermoplastic elastomer (TPE) comprising a diene elastomer block with a molar content of diene units relative to all of the units of the elastomer block of greater than 10%.

The use of such an adhesive layer has the advantage of enabling cocrosslinking of the adhesive layer and the rubber material of the tyre's inner or outer surface during the vulcanization of the tyre by virtue of the presence of the double bonds present in the diene elastomers. The adhesive layer is thus bound stably and durably to the surface of the tyre by cocrosslinking and makes it possible to dispense with the presence of a fabric.

Another subject of the invention is a member intended to be fixed to the surface of a tyre, characterized in that this member comprises an attachment layer, the composition of which is based on a block thermoplastic elastomer, and such that the peel force after joining at a temperature above the softening temperatures of the adhesive layer and the attachment layer is greater than 2 N/mm at 60° C.

According to a preferential embodiment, the thermoplastic block of the thermoplastic elastomer of the attachment layer is of the same nature as the thermoplastic block of the block thermoplastic elastomer of the composition of the adhesive layer of the accommodating region of the tyre.

In addition, according to a very preferential embodiment, the TPE of the attachment layer is identical to the TPE of the adhesive layer.

The adhesive bonding solutions developed in this way are environmentally friendly and do not use irreversible chemical crosslinking.

Moreover, this method of attachment affords a high degree of freedom as regards the geometry and functions of the member, due to the attachment post-vulcanization.

The member may be a casing able to receive an electronic device.

The member may also be an electronic device.

It may also especially be a marking or a decoration.

Another subject of the invention is an assembly comprising a tyre with a member attached to the surface thereof by the adhesive layer bound to the attachment layer.

Another subject of the invention is a method for attaching a member with an attachment layer to the surface of a tyre with an adhesive layer protected by a protective film arranged on an accommodating region, in which:
  all or a portion of the protective film is removed;
  said adhesive layer and said attachment layer are brought to a temperature greater than the softening points or Tg (or M.p., if appropriate) of said block thermoplastic elastomers; and
  the attachment layer and the adhesive layer are brought into contact by applying pressure thereto.

The member is also attached very rapidly and very simply. The attachment is effective and durable as soon as the temperatures of the adhesive layer and attachment layer have returned below the softening points or Tg (or M.p., if appropriate) of the TPEs. It also has the advantage of being entirely reversible.

DETAILED DESCRIPTION OF THE INVENTION

In the present description, unless expressly indicated otherwise, all the percentages (%) shown are % by weight.

"One" or "a" is intended to mean "one or more"; by way of example, "a thermoplastic elastomer" is equivalent to "one or more thermoplastic elastomers".

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

The details of the invention will be explained below by the description, firstly, of the specific constituents of the tyre according to one of the subjects of the invention, then by the description of the method of manufacture of the tyre and the characterization tests carried out.

The tyre according to the invention has the essential features of being provided, at a given accommodating region of the surface thereof, with an adhesive layer comprising a thermoplastic elastomer and protected by a protective film as are defined below.

Thermoplastic Elastomer (TPE)

Thermoplastic elastomers (abbreviated to "TPEs") have a structure intermediate between thermoplastic polymers and elastomers. These are block copolymers composed of rigid thermoplastic blocks connected via flexible elastomer blocks.

The thermoplastic elastomer used for the implementation of the invention is a block copolymer, the chemical nature of the thermoplastic and elastomer blocks of which can vary.

Structure of the TPE

The number-average molecular weight (denoted Mn) of the TPE is preferentially less than 500 000 g/mol, more preferentially less than 400 000 g/mol. This is because too high an Mn may be detrimental to the adhesive bonding of the member or for the use of the TPE. As regards the minimum value, it has been observed that the presence of low Mn weights (less than 30 000 g/mol) may be favourable for the adhesive bonding of the sensor. This may be obtained by a TPE with a broad distribution of molecular weights Mn, or by mixing several TPEs with suitable molecular weights.

The number-average molecular weight (Mn) of the TPE elastomer is determined, in a known manner, by size exclusion chromatography (SEC). For example, in the case of styrene thermoplastic elastomers, the sample is dissolved beforehand in tetrahydrofuran at a concentration of approximately 1 g/l and then the solution is filtered through a filter with a porosity of 0.45 µm before injection. The apparatus used is a Waters Alliance chromatographic line. The elution solvent is tetrahydrofuran, the flow rate is 0.7 ml/min, the temperature of the system is 35° C. and the analytical time is 90 min. A set of four Waters columns in series, with the Styragel tradenames (HMW7, HMW6E and two HT6Es), is used. The injected volume of the solution of the polymer sample is 100 µl. The detector is a Waters 2410 differential refractometer and its associated software, for making use of the chromatographic data, is the Waters Millennium system. The calculated average molar masses are relative to a calibration curve produced with polystyrene standards. The conditions can be adjusted by those skilled in the art.

In order to be both elastomeric and thermoplastic in nature, the TPE has to be composed of blocks which are sufficiently incompatible (that is to say, different as a result of their respective weights, their respective polarities or their respective Tg values) to retain their own properties of elastomer block or thermoplastic block.

The TPEs can be copolymers with a small number of blocks (less than 5, typically 2 or 3), in which case these blocks preferably have high weights of greater than 15 000 g/mol. These TPEs may for example be mixtures of diblock copolymers, comprising a thermoplastic block and an elastomer block, and of triblock copolymers with two hard segments connected by a soft segment. These mixtures may be predominantly diblock or triblock. It is usually possible to have a triblock content of between 60% and 80%. The hard and soft segments can be positioned linearly, or in a star or branched configuration. Typically, each of these segments or blocks often comprises a minimum of more than 5, generally of more than 10, base units (for example, styrene units and butadiene units for a styrene/butadiene/styrene block copolymer).

The TPEs can also comprise a large number of smaller blocks (more than 30, typically from 50 to 500), in which case these blocks preferably have low weights, for example from 500 to 5000 g/mol; these TPEs will subsequently be referred to as multiblock TPEs and are an elastomer block/thermoplastic block series.

According to a first variant, the TPE is in a linear form. For example, the TPE is a mixture of diblock copolymer: thermoplastic block/elastomer block, and of triblock copolymer:thermoplastic block/elastomer block/thermoplastic block, that is to say a central elastomer block and two terminal thermoplastic blocks, at each of the two ends of the elastomer block. Equally, the multiblock TPE can be a linear series of elastomer blocks/thermoplastic blocks. The TPEs according to this variant are favourable for good adhesion of the member.

According to another variant of the invention, the TPE of use for the requirements of the invention is in a star-branched form comprising at least three branches. For example, the TPE can then be composed of a star-branched elastomer block comprising at least three branches and of a thermoplastic block located at the end of each of the branches of the elastomer block. The number of branches of the central elastomer can vary, for example, from 3 to 12 and preferably from 3 to 6. This TPE variant is favourable for good temperature resistance.

According to another alternative form of the invention, the TPE is provided in a branched or dendrimer form. The TPE can then be composed of a branched or dendrimer elastomer block and of a thermoplastic block located at the end of the branches of the dendrimer elastomer block.

Nature of the Elastomer Blocks

The elastomer blocks of the TPE for the requirements of the invention can be any unsaturated diene elastomers known to those skilled in the art. They generally have a Tg of less than 25° C., preferentially of less than 10° C., more preferentially of less than 0° C. and very preferentially of less than −10° C. Also preferentially, the elastomer block Tg of the TPE is greater than −100° C.

A "diene" elastomer (or rubber, the terms being used interchangeably) should be understood, in a known way, as an (or several) elastomer(s) consisting, at least in part (i.e., a homopolymer or a copolymer), of diene monomer units (monomers bearing two conjugated or unconjugated carbon-carbon double bonds).

These diene elastomers can be classified into two categories: "unsaturated" or "saturated". "Essentially unsaturated" is generally intended to mean a diene elastomer resulting at least in part from conjugated diene monomers having a content of unsaturations or of units of diene origin (conjugated dienes) which is greater than 10% (mol %); thus, diene elastomers such as butyl rubbers do not fall under the preceding definition and can especially be described as "saturated" diene elastomers (low or very low molar content, for example of the order of 4%, always less than 10%, of units of diene origin). In the category of the "unsaturated" diene elastomers which may be used for the invention, all the diene elastomers having a molar content of unsaturations or of units of diene origin (conjugated dienes) of greater than 10%, and in particular the "highly unsaturated" diene elastomers, that is to say the diene elastomers having a molar content of unsaturations or of units of diene origin (conjugated dienes) which is greater than 50%, are intended.

"Unsaturated diene elastomer able to be used in the elastomer blocks in accordance with the invention" is more particularly intended to mean:

(a) any homopolymer of a conjugated diene monomer, especially any homopolymer obtained by polymerization of a conjugated diene monomer having from 4 to 12 carbon atoms; and (b) any copolymer obtained by copolymerization of one or more conjugated dienes with one another or with one or more vinylaromatic compounds having from 8 to 20 carbon atoms.

In the case of copolymers of the type (b), the latter contain from 20% to 99% by weight of diene units and from 1% to 80% by weight of vinylaromatic units.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene.

The following, for example, are suitable as vinylaromatic compounds: styrene, ortho-, meta- or para-methyl styrene, the "vinyltoluene" commercial mixture, para-(tert-butyl) styrene, methoxystyrenes, chlorostyrenes, vinylmesitylene, divinylbenzene or vinylnaphthalene.

According to a preferential embodiment of the invention, the elastomer blocks of the TPE have, in total, a number-average molecular weight (Mn) ranging from 25 000 g/mol to 350 000 g/mol, preferably from 35 000 g/mol to 250 000 g/mol, so as to confer, on the TPE, good elastomeric properties and a mechanical strength which is sufficient and compatible with the use as adhesive layer for the attachment of a member to the surface of a tyre.

The elastomer block can also be a block comprising several types of ethylene, diene or styrene monomers as defined above.

The elastomer block may also consist of several elastomer blocks as defined above.

The microstructure of the elastomers is determined by $^1$H NMR analysis, supplemented by $^{13}$C NMR analysis when the resolution of the $^1$H NMR spectra does not enable the attribution and quantification of all the species. The measurements are carried out using a Bruker 500 MHz NMR spectrometer at frequencies of 500.43 MHz for observing protons and at 125.83 MHz for observing carbons.

For the measurements of mixtures or elastomers which are insoluble but which have the ability to swell in a solvent, an HRMAS z-grad 4 mm probe is used, making it possible to observe protons and carbons in proton-decoupled mode. The spectra are acquired at spin speeds of 4000 Hz to 5000 Hz.

For the measurements of soluble elastomers, a liquid NMR probe is used, making it possible to observe protons and carbons in proton-decoupled mode.

The insoluble samples are prepared in rotors filled with the analyte and a deuterated solvent enabling swelling, in general deuterated chloroform (CDCl$_3$). The solvent used must always be deuterated and its chemical nature may be adapted by those skilled in the art. The amounts of material used are adjusted so as to obtained spectra with sufficient sensitivity and resolution.

The soluble samples are dissolved in a deuterated solvent (approximately 25 mg of elastomer in 1 ml), in general deuterated chloroform (CDCl$_3$). The solvent or solvent blend used must always be deuterated and its chemical nature may be adapted by those skilled in the art.

In both cases (soluble sample or swollen sample):

For the proton NMR, a simple 30° pulse sequence is used. The spectral window is adjusted to observe all the resonance lines belonging to the molecules analysed. The accumulation number is adjusted in order to obtain a signal to noise ratio that is sufficient for the quantification of each unit. The recycle period between each pulse is adapted to obtain a quantitative measurement.

For the carbon NMR, a simple 30° pulse sequence is used with proton decoupling only during acquisition to avoid the "nuclear Overhauser" effects (NOE) and remain quantitative. The spectral window is adjusted to observe all the resonance lines belonging to the molecules analysed. The accumulation number is adjusted in order to obtain a signal to noise ratio that is sufficient for the quantification of each unit. The recycle period between each pulse is adapted to obtain a quantitative measurement.

The measurements are carried out at 25° C.

Nature of the Thermoplastic Blocks

Use will be made, for the definition of the thermoplastic blocks, of the characteristic of glass transition temperature (Tg) of the hard thermoplastic block. This characteristic is well known to a person skilled in the art. It especially makes it possible to choose the industrial processing (transformation) temperature. In the case of an amorphous polymer (or polymer block), the processing temperature is chosen to be substantially greater than the Tg of the thermoplastic block. In the specific case of a semicrystalline polymer (or polymer block), a melting point may be observed which is then greater than the glass transition temperature. In this case, it is instead the melting point (M.p.) which makes it possible to choose the processing temperature for the polymer (or polymer block) under consideration. Thus, subsequently, when reference is made to "Tg (or M.p., if appropriate)", this will have to be considered to be the temperature used to choose the processing temperature.

It is also possible to consider the softening point of the TPEs. This softening point is close to the processing temperature. In order to determine it, it is possible, for example, to subject a sample to a fixed compressive stress, place the sample in an oven making it possible to carry out a temperature ramp from room temperature to a given temperature, of the order of the maximum curing temperature (for example: 180° C.), with given kinetics, during which the deformation of the sample is recorded. The results are in the form of a curve of deformation of the sample as a function of temperature; the softening point is usually considered to be that for which the material has a reduction in its thickness of 10%.

For the requirements of the invention, the TPE elastomers comprise one or more thermoplastic block(s) preferably having a Tg (or M.p., if appropriate) of greater than or equal to 60° C. and formed from polymerized monomers. Preferably, this thermoplastic block has a Tg (or M.p., if appropriate) within a range varying from 60° C. to 250° C. Preferably, the Tg (or M.p., if appropriate) of this thermoplastic block is preferably from 80° C. to 200° C., more preferably from 100° C. to 180° C.

The proportion of the thermoplastic blocks, with respect to the TPE as defined for the implementation of the invention, is determined, on the one hand, by the thermoplasticity properties which the said copolymer has to exhibit. The thermoplastic blocks having a Tg (or M.p., if appropriate) of greater than or equal to 60° C. are preferentially present in proportions sufficient to retain the thermoplastic nature of the elastomer according to the invention. The minimum content of thermoplastic blocks having a Tg (or M.p., if appropriate) of greater than or equal to 60° C. in the TPE can vary as a function of the conditions of use of the copolymer. On the other hand, the ability of the TPE to deform during the preparation of the tyre can also contribute to determining the proportion of the thermoplastic blocks having a Tg (or M.p., if appropriate) of greater than or equal to 60° C.

The thermoplastic blocks having a Tg (or M.p., if appropriate) of greater than or equal to 60° C. can be formed from polymerized monomers of various natures; they can especially form the following blocks or their mixtures:

polyolefins (polyethylene, polypropylene);
polyurethanes;
polyamides;
polyesters;
polyacetals;
polyethers (polyethylene oxide, polyphenylene ether);
polyphenylene sulphides;
polyfluorinated compounds (FEP, PFA, ETFE);
polystyrenes (described in detail below);
polycarbonates;
polysulphones;

polymethyl methacrylate;

polyetherimide;

thermoplastic copolymers, such as the acrylonitrile/butadiene/styrene (ABS) copolymer.

The thermoplastic blocks having a Tg (or M.p., if appropriate) of greater than or equal to 60° C. can also be obtained from monomers chosen from the following compounds and their mixtures:

acenaphthylene: those skilled in the art may refer, for example, to the paper by Z. Fodor and J. P. Kennedy, Polymer Bulletin, 1992, 29(6), 697-705;

indene and its derivatives, such as, for example, 2-methylindene, 3-methylindene, 4-methylindene, dimethylindenes, 2-phenylindene, 3-phenylindene and 4-phenylindene; those skilled in the art may, for example, refer to the patent document U.S. Pat. No. 4,946,899, by the inventors Kennedy, Puskas, Kaszas and Hager, and to the documents J. E. Puskas, G. Kaszas, J. P. Kennedy and W. G. Hager, Journal of Polymer Science, Part A: Polymer Chemistry (1992), 30, 41, and J. P. Kennedy, N. Meguriya and B. Keszler, Macromolecules (1991), 24(25), 6572-6577;

isoprene, then resulting in the formation of a certain number of trans-1,4-polyisoprene units and of units cyclized according to an intramolecular process; those skilled in the art may, for example, refer to the documents G. Kaszas, J. E. Puskas and J. P. Kennedy, Applied Polymer Science (1990), 39(1), 119-144, and J. E. Puskas, G. Kaszas and J. P. Kennedy, Macromolecular Science, Chemistry A28 (1991), 65-80.

The polystyrenes are obtained from styrene monomers. Styrene monomer should be understood as meaning, in the present description, any monomer comprising styrene, unsubstituted or substituted; mention may be made, among substituted styrenes, for example, of methylstyrenes (for example, o-methylstyrene, m-methylstyrene or p-methylstyrene, α-methyl styrene, α,2-dimethyl styrene, α,4-dimethyl styrene or diphenylethylene), para-(tert-butyl)styrene, chlorostyrenes (for example, o-chlorostyrene, m-chlorostyrene, p-chlorostyrene, 2,4-dichlorostyrene, 2,6-dichlorostyrene or 2,4,6-trichlorostyrene), bromostyrenes (for example, o-bromostyrene, m-bromostyrene, p-bromostyrene, 2,4-dibromostyrene, 2,6-dibromostyrene or 2,4,6-tribromostyrenes), fluorostyrenes (for example, o-fluorostyrene, m-fluorostyrene, p-fluorostyrene, 2,4-difluorostyrene, 2,6-difluorostyrene or 2,4,6-trifluorostyrenes) or else para-hydroxystyrene.

According to a preferential embodiment of the invention, the content by weight of styrene in the TPE elastomer is between 5% and 50%. Below the minimum indicated, there is a risk of the thermoplastic nature of the elastomer being substantially reduced while, above the recommended maximum, the elasticity of the adhesive layer can be affected. For these reasons, the styrene content is more preferentially between 10% and 40%.

According to an alternative form of the invention, the polymerized monomer as defined above can be copolymerized with at least one other monomer, so as to form a thermoplastic block having a Tg (or M.p., if appropriate) as defined above.

By way of illustration, this other monomer capable of copolymerizing with the polymerized monomer can be chosen from diene monomers, more particularly conjugated diene monomers having from 4 to 14 carbon atoms, and monomers of vinylaromatic type having from 8 to 20 carbon atoms, such as defined in the part relating to the elastomer block.

According to the invention, the thermoplastic blocks of the TPE have, in total, a number-average molecular weight ("Mn") ranging from 5000 g/mol to 150 000 g/mol, so as to confer, on the TPE, good elastomeric properties and a mechanical strength which is sufficient and compatible with the use as adhesive layer for the attachment of a member to the surface of a tyre.

The thermoplastic block may also consist of several thermoplastic blocks as defined above.

TPE Examples

The TPE of the adhesive layer of the tyre according to the invention is a copolymer the elastomer part of which is unsaturated and which comprises diene blocks and advantageously styrene blocks, these diene blocks being in particular isoprene or butadiene blocks. More preferentially, this TPE elastomer is selected from the following group consisting of diblock or triblock copolymers which are linear or star-branched: styrene/butadiene (SB), styrene/isoprene (SI), styrene/butadiene/isoprene (SBI), styrene/butadiene/styrene (SBS), styrene/isoprene/styrene (SIS), styrene/butadiene/isoprene/styrene (SBIS) and the mixtures of these copolymers.

For example again, the TPE is a linear or star-branched copolymer, the elastomer part of which comprises a saturated part and an unsaturated part, such as, for example, styrene/butadiene/butylene (SBB), styrene/butadiene/butylene/styrene (SBBS) or a mixture of these copolymers.

By way of examples of commercially available TPE elastomers, mention may be made of the elastomers of SIS type sold by Kuraray under the name Hybrar 5125 or sold by Kraton under the name D1161, or else the elastomers of linear SBS type sold by Polimeri Europa under the name Europrene SOLT 166 or of star-branched SBS type sold by Kraton under the name D1184. Mention may also be made of the elastomers sold by Dexco Polymers under the Vector name (e.g., Vector 4114 or Vector 8508).

Protective Film

The protective film must be a flexible, heat-resistant film which must also have limited adhesion to the adhesive layer, in order to be removable therefrom. The peel force of the film from the adhesive layer is preferably less than 1 N/mm at 20° C.

This film makes it possible to protect the surface of the adhesive layer during operations for assembling the tyre and the vulcanization thereof in a mould.

It may especially be a thermoplastic film. This thermoplastic film is advantageously selected from the group consisting of polyesters, polyamides and films comprising at least one fluoropolymer. Those skilled in the art will know how to choose the thickness thereof in order to obtain the best compromise between the flexibility and mechanical strength thereof. This thickness is advantageously between 10 and 300 μm.

The nature of the protective film may be incompatible with that of the TPE of the adhesive layer, in order to obtain a suitably limited adhesion.

In a preferential use, this film is removed just before placing the member on the surface of the tyre, in order to avoid any fouling of the surface of the adhesive layer. The film therefore has the advantage of protecting the adhesive layer during all the phases of transportation and storage of the tyres.

Preferably, the Tg (or M.p., if appropriate) of the protective film is greater than the curing temperature of the rubber mixture of the accommodating region of the surface of the tyre. A temperature of 200° C. enables the film to withstand the usual temperatures for vulcanization of passenger vehicle tyres.

As an example of polyester film, use may be made of the films sold under the brand name Mylar with a thickness of between 0.03 and 0.2 mm. Such a polyester film has a melting point of greater than 230° C.

Fluorinated ethylene/propylene copolymers (FEPs) may be chosen as fluoropolymers. Advantageously, the film comprises a copolymer of tetrafluoroethylene (TFE) and hexafluoropropylene (HFP).

These polymers have noteworthy anti-stick properties.

An example of a suitable film is the A5000 film from Aerovac Systèmes France. This film comprises a fluorinated ethylene/propylene copolymer or FEP. This film has a maximum usage temperature of the order of 204° C. and an elongation at break of greater than 300%. The thickness thereof is 25 µm. These features enable it to be placed directly on the building drum of the pneumatic tyre, in the specific case of accommodating zone placed on the inner rubber surface of the tyre.

The following table gives examples of films which are suitable for the invention.

| Name | Supplier | Type | Thickness | T max | Elongation |
|---|---|---|---|---|---|
| A5000 | Aerovac | FEP | 25 µm | 260° C. | >300% |
| A6000 | Aerovac | ETFE | 12, 15 and 20 µm | 230° C. | >200% |
| MR Film | Aerovac | PTFE | 25 µm | 315° C. | >550% |
| FEP100 | Dupont | FEP | 25 µm | 260° C. | >300% |
| FEP100 | Dupont | FEP | 12.5 µm | 260° C. | >300% |
| Norton FEP 0.001 | Saint Gobain | FEP | 25 µm | 260° C. | >300% |
| Norton FEP 0.0005 | Saint Gobain | FEP | 12.5 µm | 260° C. | >300% |
| Capran 526 | Aerovac | PA 6.6 | 50 µm | 232° C. | 300% |
| Capran 75 | Aerovac | PA 6 | 22 µm | | 375% |
| Dartek C917 | Dupont | PA 6.6 | 25 µm | | |
| A2500 | Aerovac | PMP | 30 µm | 200° C. | >250% |

The protective film makes it possible to separate the adhesive layer from any contact with the building drum of the pneumatic tyre then with the curing membrane of the vulcanization mould. The incompatible nature of the protective film relative to the adhesive layer enables it to be removed from the inner surface of the pneumatic tyre after vulcanization. The removal of this protective film restores all its properties to the adhesive layer. The protective film may be removed without tearing.

Composition of the Adhesive Layer of the Tyre

The adhesive layer of the tyre according to the invention has the essential feature of comprising a block thermoplastic elastomer (TPE).

The term "one" or "a" must be understood as "at least one", that is to say one or more block thermoplastic elastomers. By way of example, it is advantageous to use a mixture of TPEs, one of which has a number-average molecular weight Mn which is suitable for good temperature resistance, and a TPE with a low weight Mn to promote good adhesive bonding between the adhesive layer of the tyre and the attachment layer of the member.

One or more TPE elastomers alone may form an adhesive layer composition of the tyre.

In a minor amount, the composition of the adhesive layer may comprise a customary diene elastomer such as an SBR, a polybutadiene or a natural or synthetic polyisoprene. Very preferentially, the content of diene elastomer in the composition is less than 20 parts per hundred parts by weight of elastomers of the composition (phr). Of course, the TPE(s) of the composition are taken into account in the elastomers of the composition.

Moreover, according to a preferential embodiment of the invention, the composition of the adhesive layer may also comprise, as plasticizing agent, an extender oil (or plasticizing oil), the function of which is to facilitate the joining of the adhesive layer and the attachment layer of the member, particularly by lowering the modulus and increasing the tackifying power.

Use may be made of any extender oil having a weakly polar nature, capable of extending or plasticizing elastomers, especially thermoplastic elastomers. At room temperature (23° C.), these oils, which are more or less viscous, are liquids (that is to say, as a reminder, substances which have the ability to eventually assume the shape of their container), in contrast especially to resins or rubbers, which are by nature solid.

Preferably, the extender oil is selected from the group consisting of polyolefinic oils (that is to say, oils resulting from the polymerization of monoolefinic or diolefinic olefins), paraffinic oils, naphthenic oils (of low or high viscosity), aromatic oils, mineral oils and the mixtures of these oils. Those skilled in the art will know how to adjust the nature and amount of extender oil as a function of the particular conditions of use of the adhesive layer.

An oil of liquid isoprene rubber (LIR) type is preferentially used. By way of example, LIR 30 and LIR 50, with number-average molecular weights of 30 000 and 50 000 g/mol, respectively, are sold by Kuraray.

The composition of the adhesive layer may moreover comprise the various additives customarily present in compositions based on block thermoplastic elastomers known to those skilled in the art. Mention will be made, for example, of reinforcing fillers, such as carbon black or silica, non-reinforcing or inert or else fibrillar fillers, colouring agents which can advantageously be used for the colouring of the composition, plasticizers other than the abovementioned extender oils, tackifying resins, protection agents, such as antioxidants or antiozonants, UV stabilizers, various processing aids or other stabilizers, or else promoters capable of promoting the adhesion to the remainder of the structure of the pneumatic object.

The use of tackifying resins may be particularly beneficial in order to adjust the softening points and also the necessary levels of adhesion of the adhesive layer or the attachment layer.

Composition of the Attachment Layer of the Member

The composition of the attachment layer of the member comprises one or more block thermoplastic elastomers selected such that the adhesive force, that is to say the force necessary to separate the two adhesive and attachment layers in a peel test is greater than 2 N/mm at 60° C.

According to a preferential embodiment, the thermoplastic blocks of the TPEs of the attachment and adhesive layers are compatible (that is to say similar due to their weights, their polarities or their Tg values) with the thermoplastic blocks of the block thermoplastic elastomer(s) of the composition of the adhesive layer of the tyre.

The TPE(s) of the attachment layer of the member may comprise unsaturated elastomer blocks such as that/those of the adhesive layer of the tyre. However, it may also comprise unsaturated elastomer blocks as described above.

According to a preferential embodiment, the thermoplastic blocks of the block thermoplastic elastomer(s) of the composition of the attachment layer of the member are identical to the thermoplastic blocks of the TPE(s) of the composition of the adhesive layer of the tyre.

According to a very preferential embodiment, the predominant TPEs of the attachment and adhesive layers are identical.

The composition of the attachment layer of the member may also comprise saturated or unsaturated diene elastomers, in a minority amount, oils or various additives as described above.

DESCRIPTION OF THE FIGURES

Supplementary elements of the invention are now described with the help of the appended drawing, presented nonlimitingly, in which:

FIG. 1 schematically represents a radial section through a pneumatic tyre or tyre incorporating, at a given accommodating region 13, an adhesive layer with a protective film according to one embodiment of the invention.

Figure 1:
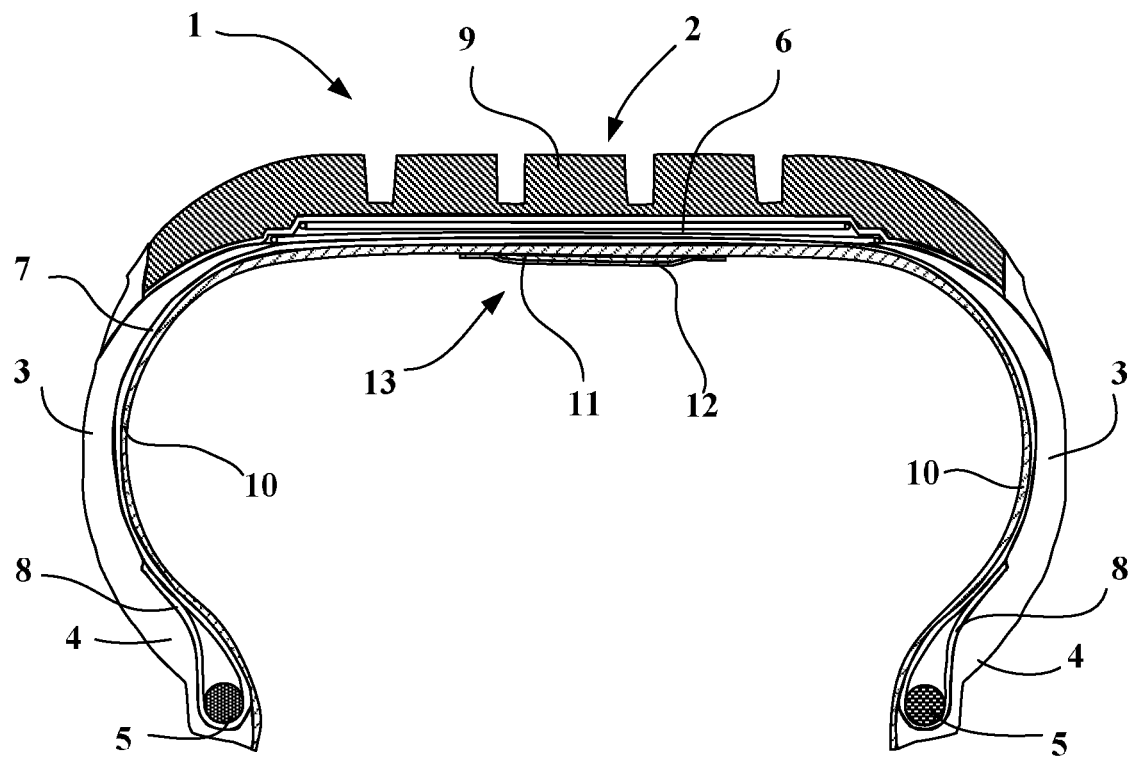
FIG. 1 represents, highly schematically (without being true to a specific scale), a radial section through a tyre in accordance with one embodiment of the invention.

This tyre 1 comprises a crown 2 reinforced by a crown reinforcement or belt 6, two sidewalls 3 and two beads 4, each of these beads 4 being reinforced with a bead wire 5. The crown reinforcement 6 is surmounted radially on the outside by a rubber tread 9. A carcass reinforcement 7 is wound around the two bead wires 5 in each bead 4, the turn-up 8 of this reinforcement 7 being, for example, arranged towards the outside of the tyre 1. The carcass reinforcement 7 is, in a way known per se, composed of at least one ply reinforced by "radial" cords, for example of textile or metal, that is to say that these cords are arranged virtually parallel to one another and extend from one bead to the other so as to form an angle of between 80° and 90° with the median circumferential plane (plane perpendicular to the axis of rotation of the tyre which is situated at mid-distance from the two beads 4 and passes through the middle of the crown reinforcement 6). An airtight layer 10 extends from one bead to the other radially internally relative to the carcass reinforcement 7.

The tyre 1 is such that its inner wall comprises, in a given accommodating region 13, an adhesive layer 11. The adhesive layer 11 is covered radially internally by a protective film 12. The thickness of the adhesive layer is preferably between 0.1 and 4 mm, and very preferentially between 0.2 and 2 mm. Those skilled in the art will know how to adapt this thickness as a function of the nature, the geometry and the weight of the member and also of the thickness of the attachment layer of the member.

The surface of the accommodating region and hence of the adhesive layer 11 must be sufficient to obtain robust attachment of the member; those skilled in the art will know how to adjust the dimensions of the adhesive layer as a function of the size and weight of the member to be attached.

The adhesive layer 11 consists of a predominantly styrene/isoprene/styrene SIS triblock copolymer of D1161 grade, from Kraton.

The detachable protective film 12 is a thermoplastic film comprising, by way of example, a fluoropolymer. The thermoplastic film is extendable, with low rigidity, and has plastic behaviour. This film must have a Tg (or M.p., if appropriate) greater than the vulcanization temperature of the pneumatic tyre. An example of a suitable film is the A5000 film from Aerovac Systèmes France. This film comprises a fluorinated ethylene/propylene copolymer or FEP. This film has a maximum usage temperature of the order of 204° C. and an elongation at break of greater than 300%. The thickness thereof is 25 μm. These features enable it, in an exemplary embodiment of the invention, to be placed directly or on the building drum of the pneumatic tyre.

Figure 2:
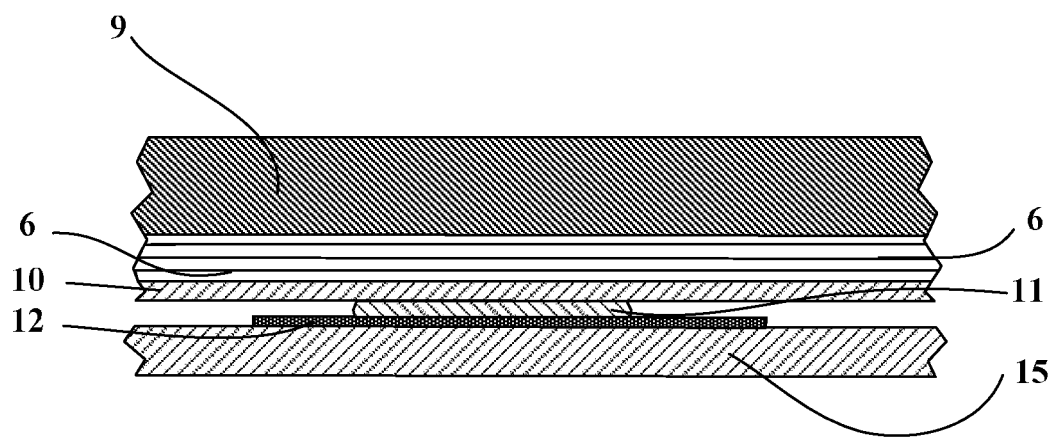
FIG. 2 presents, in radial section, a tyre blank in accordance with one embodiment of the invention.

As shown in FIG. 2, the protective film 12 extends beyond the accommodating region of the adhesive layer. The extension must be greater than 2 mm to guarantee that this adhesive layer does not become contaminated during the vulcanization of the tyre.

The detachable protective film 12 makes it possible to separate the adhesive layer from any contact with the building drum of the tyre then with the curing membrane of the vulcanization mould. The particular nature of this protective film enables it to be removed from the inner surface of the tyre after vulcanization. The removal of its protective film restores all its properties to the surface of the adhesive layer. The protective film 12 may be removed without tearing.

The pneumatic tyre of FIG. 1 may be manufactured, as indicated in FIG. 2, by integrating the adhesive layer into an unvulcanized tyre blank 1 using a building drum and the other techniques customary in the manufacture of pneumatic tyres. More specifically, the detachable protective film 12 arranged radially innermost is applied first to the building drum 15. The adhesive layer 11 is then applied. All the other customary components of the pneumatic tyre are then successively applied.

After shaping, the crown plies and the tread are applied to the tyre blank. The blank completed in this way is placed in a curing mould and vulcanized. During vulcanization, the protective film protects the curing membrane of the mould from any contact with the adhesive layer.

Upon removal from the curing mould, the protective film 12 is still attached to the adhesive layer 11.

The protective film 12 may be easily removed upon removal from the vulcanization mould of the tyre. It is also possible, and preferable, to leave this protective film in place until the member is attached.

The protective film and the adhesive layer may also be applied to the chosen accommodating region on the surface of the tyre after the shaping of the tyre blank and before the introduction thereof into the vulcanization mould.

Figure 3:
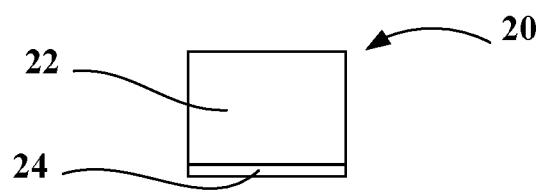
FIG. 3 illustrates a member with an attachment layer.

FIG. 3 schematically presents a member 20 comprising a casing 22 and an attachment layer 24. The material of the attachment layer 24 is based on a block thermoplastic elastomer, the hard thermoplastic blocks of which are of the same nature as the hard blocks of the TPE(s) of the adhesive layer of the tyre. The attachment layer is preferentially based on the same TPE as that of the adhesive layer. The adhesive layer and attachment layer consist of a predominantly triblock TPE based on styrene and isoprene (SIS). The thickness of the attachment layer is preferably between 0.5 and 4 mm, and very preferentially between 2 and 3 mm. Those skilled in the art will know how to adapt the thickness of the attachment layer as a function of that of the adhesive layer and of the size and weight of the member.

Figure 4:
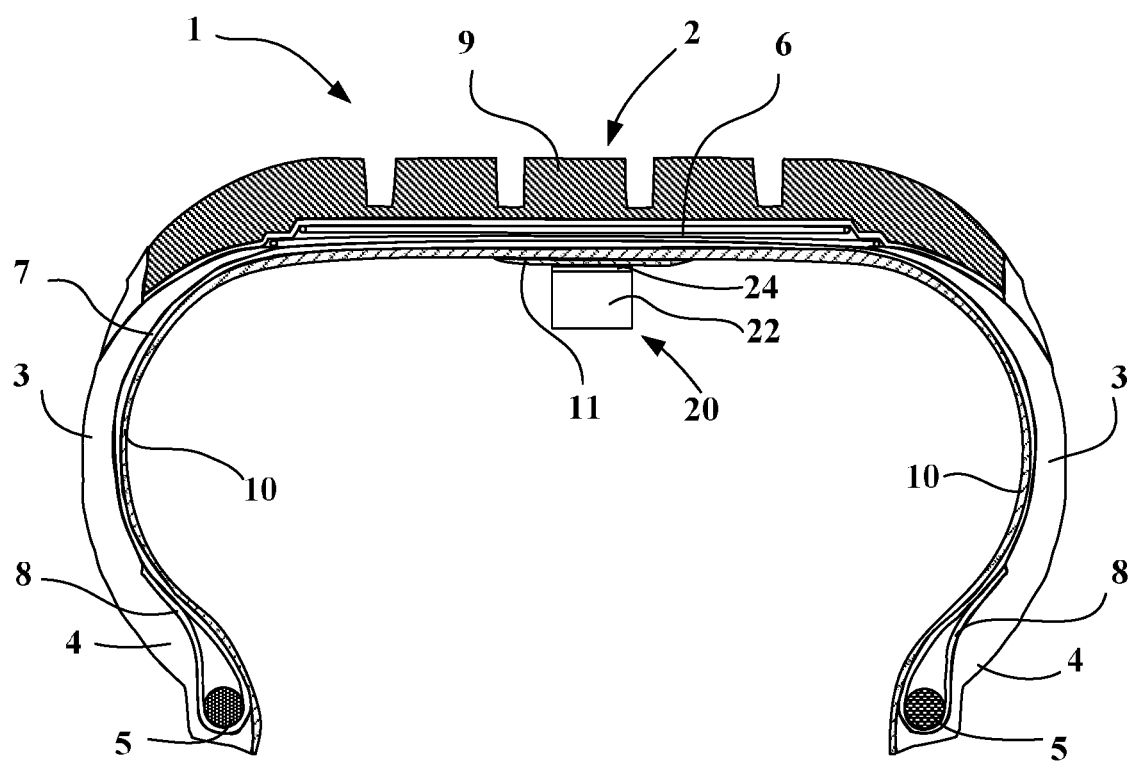
FIG. 4 shows the member attached to the surface of the tyre.

FIG. 4 presents the assembly of the tyre of FIG. 1 and the member 20 attached to the inner surface thereof, on the inner rubber.

The member 20 is fixed to the surface of the tyre easily and rapidly:
- all or a portion of the protective film 12 of the adhesive layer 11 of the tyre 1 is removed;
- the adhesive layer 11 of the tyre and the attachment layer 24 of the member are heated to temperatures greater than the Tg (or M.p., if appropriate) of these block thermoplastic elastomers; this heating may be carried out by any means (hot-air blowing, infrared radiation, etc.); the surface regions of the two adhesive and attachment layers are then above their processing temperatures and are thus softened;
- the attachment layer and the adhesive layer are brought into contact by applying a contact pressure; this contacting enables the two layers to interpenetrate one another due to the high molecular mobility linked to the temperature; and
- contact is maintained until the two adhesive and attachment layers are cooled to below the Tg (or M.p., if appropriate) values of the TPEs.

The contact pressure is preferably greater than 0.05 bar. Those skilled in the art will know to adjust this as a function of the attachment and adhesive layers used.

As soon as the cooling is achieved, the member is robustly attached to the surface of the tyre.

In the examples presented, the member is attached to the inner surface of the tyre; it is also possible to place it on an outer surface of the tyre, for example on the tyre sidewall.

Tests

Manual Peel Test

Adhesion tests (peel tests) were performed to test the capacity of the adhesive layer to adhere after curing to a diene elastomer layer, more precisely to a customary rubber composition for an inner tyre rubber (tyre liner) based on butyl rubber (copolymer of isobutylene and isoprene), also comprising the customary additives (filler, sulphur, accelerator, ZnO, stearic acid, antioxidant). Of course, this test may be adapted to the case in which the member must be placed on the tyre sidewall; in this case, to produce the test specimens, a layer of rubber sidewall mixture will be used instead of a layer of customary inner rubber.

The peeling test specimens (for 180°-type peeling) were prepared by stacking on the one hand a fabric of passenger vehicle carcass ply type and an adhesive SIS layer (1.5 mm), and on the other hand an identical fabric and a layer of customary inner rubber (1.2 mm) or an adhesive SIS layer. Each part is produced separately at 180° C. for 15 minutes in a press comprising platens.

These two parts are then assembled by bringing the SIS surface and the inner rubber surface into contact under a pressure of 0.1 bar for 1 min at 180° C. An incipient crack is inserted between the two calendered fabrics at the end of the adhesive layer.

Strips with a width of 30 mm were cut out using a cutting machine. The two sides of the incipient crack were subsequently placed in the jaws of a tensile testing device with the Instron® brand name. The tests are performed at room temperature and at a pull speed of 100 mm/min. The tensile stresses are recorded and the latter are standardized by the width of the test specimen. A curve of strength per unit of width (in N/mm) as a function of the movable crosshead displacement of the tensile testing machine (between 0 and 200 mm) is obtained. The adhesion value selected corresponds to the initiation of failure in the test specimen and thus to the maximum value of this curve.

Examples: C-1 is a customary inner rubber composition; C-2 is an adhesive layer in accordance with the invention; C-3 is an attachment layer in accordance with the invention.

TABLE 1

| Composition | C-1 | C-2 | C-3 |
|---|---|---|---|
| Butyl elastomer (1) | 100 | | |
| Carbon black (N772) | 50 | | |
| Zinc oxide | 1.5 | | |
| Stearic acid | 1.5 | | |
| Sulphenamide (2) | 1.2 | | |
| Sulphur | 1.5 | | |
| Kraton D1161 SIS | | 100 | 100 |

(1) Brominated polyisobutylene, Bromobutyl 2222, sold by Exxon Chemical Co;
(2) N-Dicyclohexyl-2-benzothiazolesulphenamide (Santocure CBS from Flexsys).

Test Results

The value obtained for adhesion of C-2 on C-3 is multiplied by 13 relative to the value for adhesion of C-2 on C-1.

TABLE 2

| | Evaluation of the adhesion between the surfaces | |
|---|---|---|
| | C-2 on C-1 | C-2 on C-3 |
| Adhesion values (N/mm) | 0.3 | 4 |

The invention thus enables rapid and reversible attachment of members to the surface of a tyre without the drawbacks linked to the preparation of the contact surface.

This attachment is reversible, that is to say that the two adhesive and attachment layers may be disassembled by heating above the Tg (or M.p., if appropriate) values of their hard blocks, then passage of a tool. The adhesive layer uncovered in this way may then be used again to adhesively bond the same member or another.

The adhesive bonding solutions developed are environmentally friendly and do not use irreversible chemical crosslinking.

Finally, this method of attachment affords a high degree of freedom as regards the geometry and functions of the member, due to the attachment post-vulcanization.

The invention claimed is:

1. An assembly of a tire and a member intended to be fixed to the surface of the tire,
   wherein the tire comprises an inner surface and/or outer surface with an accommodating region, an adhesive layer arranged on the accommodating region and a protective film arranged on the adhesive layer,
   wherein a composition of the adhesive layer consists of a block thermoplastic elastomer comprising a diene elastomer block with a molar content of diene units relative to all of the units of the elastomer block of greater than 10%, and
   wherein the member comprises an attachment layer, the composition of which consists of a block thermoplastic elastomer that is the same as the block thermoplastic elastomer of the adhesive layer of the accommodating region of the tire.

2. The assembly according to claim 1, wherein the molar content of diene units of the diene elastomer block of the composition of the adhesive layer relative to all of the units of the elastomer block is greater than 50%.

3. The assembly according to claim 1, wherein the diene of the diene elastomer block is selected from the C4-C12 conjugated dienes.

4. The assembly according to claim 1, wherein the diene elastomer block is a copolymer obtained by copolymerization of one or more dienes conjugated with one another or with one or more vinylaromatic compounds having from 8 to 20 carbon atoms.

5. The assembly according to claim 1, wherein the diene of the diene elastomer block is selected from the group consisting of butadienes, isoprenes, and mixtures thereof.

6. The assembly according to claim 1, wherein the diene elastomer block is based on isoprene.

7. The assembly according to claim 1, wherein a thermoplastic block of the block thermoplastic elastomer of the composition of the adhesive layer is selected from the group consisting of polyamide, polyester and styrene blocks.

8. The assembly according to claim 7, wherein the thermoplastic block of the block thermoplastic elastomer of the composition of the adhesive layer is a styrene block.

9. The assembly according to claim 8, wherein the block thermoplastic elastomer is selected from the group consisting of styrene/isoprene block copolymers.

10. The assembly according to claim 9, wherein the block thermoplastic elastomer is a predominantly styrene/isoprene diblock copolymer.

11. The assembly according to claim 9, wherein the block thermoplastic elastomer is a predominantly styrene/isoprene/styrene triblock copolymer.

12. The assembly according to claim 1, wherein the block thermoplastic elastomer of the composition of the adhesive layer is a block thermoplastic elastomer mixture.

13. The assembly according to claim 1, wherein the protective film is a thermoplastic film selected such that the peel force of the protective film from the adhesive layer is less than 1 N/mm at 20° C.

14. The assembly according to claim 13, wherein the protective film is selected from the group consisting of polyesters, polyamides and films comprising at least one fluoropolymer.

15. The assembly according to claim 14, wherein the fluoropolymer comprises a fluorinated ethylene/propylene copolymer.

16. The assembly according to claim 1, wherein the Tg or melting point, if appropriate, of the protective film is greater than the maximum curing temperature of the rubber mixture of the accommodating region.

17. The assembly according to claim 1, wherein the member is a casing able to receive an electronic device.

18. The assembly according to claim 1, wherein the member is an electronic device.

19. A method for making an assembly according to claim 1 comprising the steps of:
   removing all or a portion of the protective film;
   bringing both the adhesive layer and the attachment layer to a temperature greater than the softening points of the thermoplastic blocks of the block thermoplastic elastomers; and
   bringing the attachment layer and the adhesive layer into contact by applying pressure thereto.

20. An assembly of a tire and a member intended to be fixed to the surface of the tire,
   wherein the tire comprises an inner surface and/or outer surface with an accommodating region, an adhesive layer arranged on the accommodating region and a protective film arranged on the adhesive layer,
   wherein a composition of the adhesive layer consists of a block thermoplastic elastomer comprising a diene elastomer block with a molar content of diene units relative to all of the units of the elastomer block of greater than 10%,
   wherein the protective film is selected from the group consisting of polyesters, polyamides and films comprising at least one fluoropolymer, and
   wherein the member comprises an attachment layer, the composition of which consists of a block thermoplastic elastomer that is the same as the block thermoplastic elastomer of the adhesive layer of the accommodating region of the tire.

* * * * *